(12) United States Patent
Lewis et al.

(10) Patent No.: US 10,404,680 B2
(45) Date of Patent: Sep. 3, 2019

(54) METHOD FOR OBTAINING VETTED CERTIFICATES BY MICROSERVICES IN ELASTIC CLOUD ENVIRONMENTS

(71) Applicant: MOTOROLA SOLUTIONS, INC, Schaumburg, IL (US)

(72) Inventors: Adam C. Lewis, Buffalo Grove, IL (US); Anthony R. Metke, Naperville, IL (US); Shanthi E. Thomas, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 171 days.

(21) Appl. No.: 15/234,180

(22) Filed: Aug. 11, 2016

(65) Prior Publication Data

US 2018/0048638 A1 Feb. 15, 2018

(51) Int. Cl.
| | |
|---|---|
| H04L 29/00 | (2006.01) |
| H04L 29/06 | (2006.01) |
| G06F 9/455 | (2018.01) |
| G06F 9/50 | (2006.01) |
| G06F 21/53 | (2013.01) |
| H04L 9/32 | (2006.01) |
| G06F 9/46 | (2006.01) |

(52) U.S. Cl.
CPC ...... *H04L 63/0823* (2013.01); *G06F 9/45533* (2013.01); *G06F 9/45558* (2013.01); *G06F 9/46* (2013.01); *G06F 9/5077* (2013.01); *G06F 21/53* (2013.01); *H04L 9/3228* (2013.01); *H04L 9/3268* (2013.01); *H04L 63/06* (2013.01); *H04L 63/0807* (2013.01); *G06F 2009/45587* (2013.01)

(58) Field of Classification Search
CPC ..... H04L 63/0823; H04L 63/06; H04L 9/006; H04L 9/3268; H04L 9/45558; H04L 67/10; G06F 21/53; G06F 2009/45587; G06F 9/45533; G06F 9/45558; G06F 9/5077
USPC ........................................................ 713/156
See application file for complete search history.

(56) References Cited

U.S. PATENT DOCUMENTS

| | | | |
|---|---|---|---|
| 9,329,810 B2 * | 5/2016 | Shustef | G06F 3/1204 |
| 2012/0096525 A1 * | 4/2012 | Bolgert | G06F 11/3006 |
| | | | 726/6 |
| 2012/0254960 A1 * | 10/2012 | Lortz | H04L 63/104 |
| | | | 726/7 |
| 2013/0073856 A1 | 3/2013 | Sherkin et al. | |
| 2013/0325823 A1 | 12/2013 | Resch et al. | |

(Continued)

OTHER PUBLICATIONS

The International Search Report and the Written Opinion, corresponding patent application No. PCT/US2017/044166 filed Jul. 27, 2017, all pages.

*Primary Examiner* — Syed A Zaidi

(57) ABSTRACT

A method and is provided for obtaining a vetted certificate for a microservice in an elastic cloud environment. The microservice receives a one-time authentication credential. The microservice utilizes the one-time authentication credential to obtain a client secret. The microservice obtains an access token and CSR (Certificate Signing Request) attributes using the client secret and constructs a CSR utilizing the CSR attributes. The microservice requests a vetted certificate from a Certificate Authority (CA) and includes the access token and the CSR in the request. If the access token and the CSR pass vetting at the CA, the CA sends a vetted certificate to the microservice.

15 Claims, 3 Drawing Sheets

(56) References Cited

U.S. PATENT DOCUMENTS

| | | | |
|---|---|---|---|
| 2014/0101775 A1* | 4/2014 | Cheung | H04L 63/0428 |
| | | | 726/27 |
| 2014/0122873 A1* | 5/2014 | Deutsch | H04L 63/20 |
| | | | 713/158 |
| 2016/0127353 A1 | 5/2016 | Thomas et al. | |
| 2017/0063833 A1* | 3/2017 | Colle | H04L 63/083 |
| 2017/0195332 A1* | 7/2017 | Wu | G05B 19/41885 |
| 2017/0329957 A1* | 11/2017 | Vepa | G06F 21/445 |
| 2017/0331832 A1* | 11/2017 | Lander | H04L 63/102 |

* cited by examiner ically includes
an application or microservice. The application or microservice needs to communicate securely with other containerized applications or microservices.

METHOD FOR OBTAINING VETTED CERTIFICATES BY MICROSERVICES IN ELASTIC CLOUD ENVIRONMENTS

BACKGROUND OF THE INVENTION

Containerized, cloud-based, elastic architectures are becoming more popular. Each container typically includes an application or microservice. The application or microservice needs to communicate securely with other containerized applications or microservices.

One issue with containers is the need to protect data in transit. The applications and microservices must also be able to mutually authenticate each other. One method of doing this to use SSL (Secure Sockets Layer), which is a security technology for establishing an encrypted link between two applications. SSL addresses both of these security needs; however, SSL depends on X.509 certificates, in which case each container will require a public-private key-pair and a corresponding certificate.

One problem with using SSL in containerized environments is that containers exist in elastic environments, where containers are dynamically spawned to meet demand, destroyed when no longer needed, and spawned again when demand once again spikes. This is not the environment for which SSL was designed.

Another problem is that in cloud environments deployment is fully automated. Since there is no human presence, the cloud networks cannot rely on using a human's credential to verify and confirm the identity of the container being spawned. Further, it is unacceptable from a security standpoint to attempt to bake the private keys into the container images, as they easily leak out, leading to security vulnerabilities.

Therefore a need exists for an improved method for providing secure communication between microservices in elastic cloud environments.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
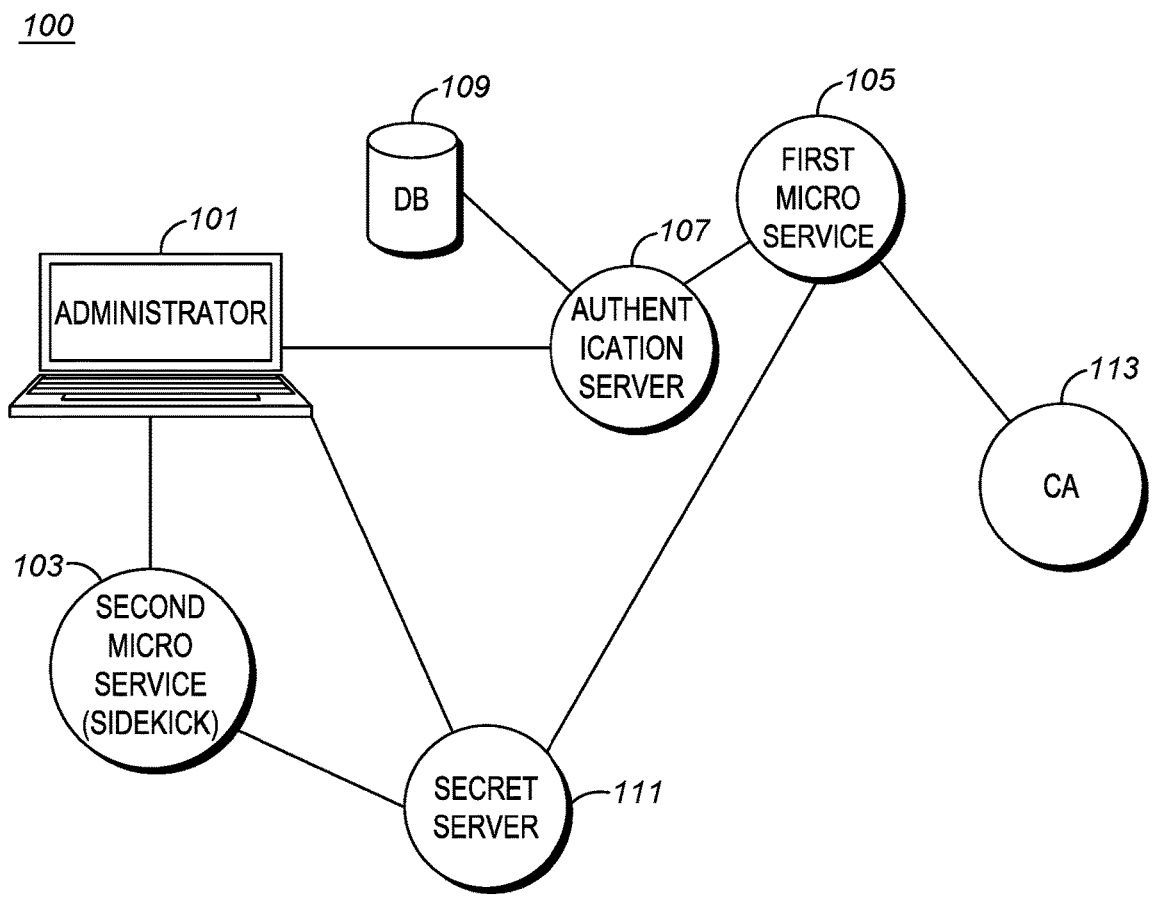
FIG. 1 is a system diagram illustrating a cloud network in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and device for obtaining a vetted certificate for a microservice in an elastic cloud environment. The microservice receives a one-time authentication credential and uses the one-time authentication credential to obtain a client secret. The microservice obtains an access token including CSR (Certificate Signing Request) attributes using the client secret. The microservice constructs a CSR utilizing the CSR attributes. The microservice requests a vetted certificate from a Certificate Authority (CA) by sending a request including the access token and the CSR to the CA. The CA vets the request by matching the attributes requested in the CSR to the attributes embedded in the access token. If there is a match, the CA considers the CSR to be vetted, and the CA sends a vetted certificate to the microservice.

FIG. 1 is a system diagram illustrating a cloud network 100 in accordance with an exemplary embodiment of the present invention. Cloud network 100 preferably includes Administrator 101, Second Microservice 103, First Microservice 105, Authorization Server 107, database 109, Secret Server 111, and Certificate Authority 113.

Administrator 101 is coupled to Second Microservice 103, Authorization Server 107, and Secret Server 111. Administrator 101 can be a person, a computing device, or a combination of the two. Administrator 101 provides signup and management of users and their access to servers or services.

Administrator 101 creates a secret management bucket in Secret server 111 that is preferably accessed via a token and other credentials, such as an APP_ID or USER_ID, a username or password, or certificates. Administrator 101 passes this information to Second Microservice 103. Administrator 101 also preferably creates a client with Authorization Server 107 using a client ID and a client secret. Administrator 101 also preferably store the client ID and client secret in Secret Server 111. Administrator 101 further generates an APP_ID and stores it in the Secret Server 111.

Second Microservice 103 is a microservice that assists in establishing secure containers in a cloud-based network. Second Microservice 103 is coupled to Administrator 101 and Secret Server 111. As used herein, a microservice is a process that communicates with another microservice to accomplish a goal within cloud network 100. Microservices are typically small software modules that utilize lightweight protocols. Second Microservice 103 generates a new USER_ID and maps the USER_ID to the APP_ID in the secret management bucket. Second Microservice 103 also spawns a new microservice, First Microservice 105, and passes it the APP_ID/USER_ID.

First Microservice 105 is coupled to Authorization Server 107, Secret Server 111, and Certificate Authority 113. First Microservice 105 preferably includes a transceiver and a processor coupled to the transceiver. First Microservice 105 logs in to Secret Server 111 using the APP_ID/USER_ID tuple and retrieves the client ID and client secret. First Microservice 105 uses the client ID and the client secret to retrieve an access token including authorized CSR attributes from Authorization Server 107. In an exemplary embodiment, First Microservice 105 generates a key pair and a CSR, based at least in part upon the CSR attributes in the access token. First Microservice 105 sends the access token and the CSR to Certificate Authority 113, which vets the CSR by checking the attributes included in the CSR against the attributes included in the access token and returns a certificate to First Microservice 105 if the values match and the vetting is successful.

Authorization Server 107 is an application that is used to authenticate the credentials of a microservice to authorize the microservice to access one or more other microservices. The credentials can be, for example, client identifiers and passwords. Authorization Server 107 is coupled to Administrator 101, First Microservice 105, and database 109. Authorization Server 107 can reside on a dedicated computer, but can alternately be housed in an Ethernet switch, an access point, or a network access server. Authorization Server 107, upon verifying credentials, preferably issues a token that can be used to access various services.

Database 109 is coupled to Authorization Server 107 and provides storage of information for Authorization Server 107. In accordance with an exemplary embodiment, database 109 stores a Client ID and CSR Attributes.

Secret Server 111 is coupled to Administrator 101, Second Microservice 103, and First Microservice 105. Secret Server 111 provides secure password management in network 100. Secret Server 111 preferably provides the ability to manage and organize secrets, assign user permissions and access control policies to the secrets, provide encryption and authentication, and provide disaster recovery.

Certificate Authority 113 is coupled to First Microservice 105 and is an entity that issues digital certificates. A digital certificate certifies the ownership of a public key by the named subject of the certificate, which allows relying parties to rely upon signatures made about the private key that corresponds to the certified public key.

Figure 2:
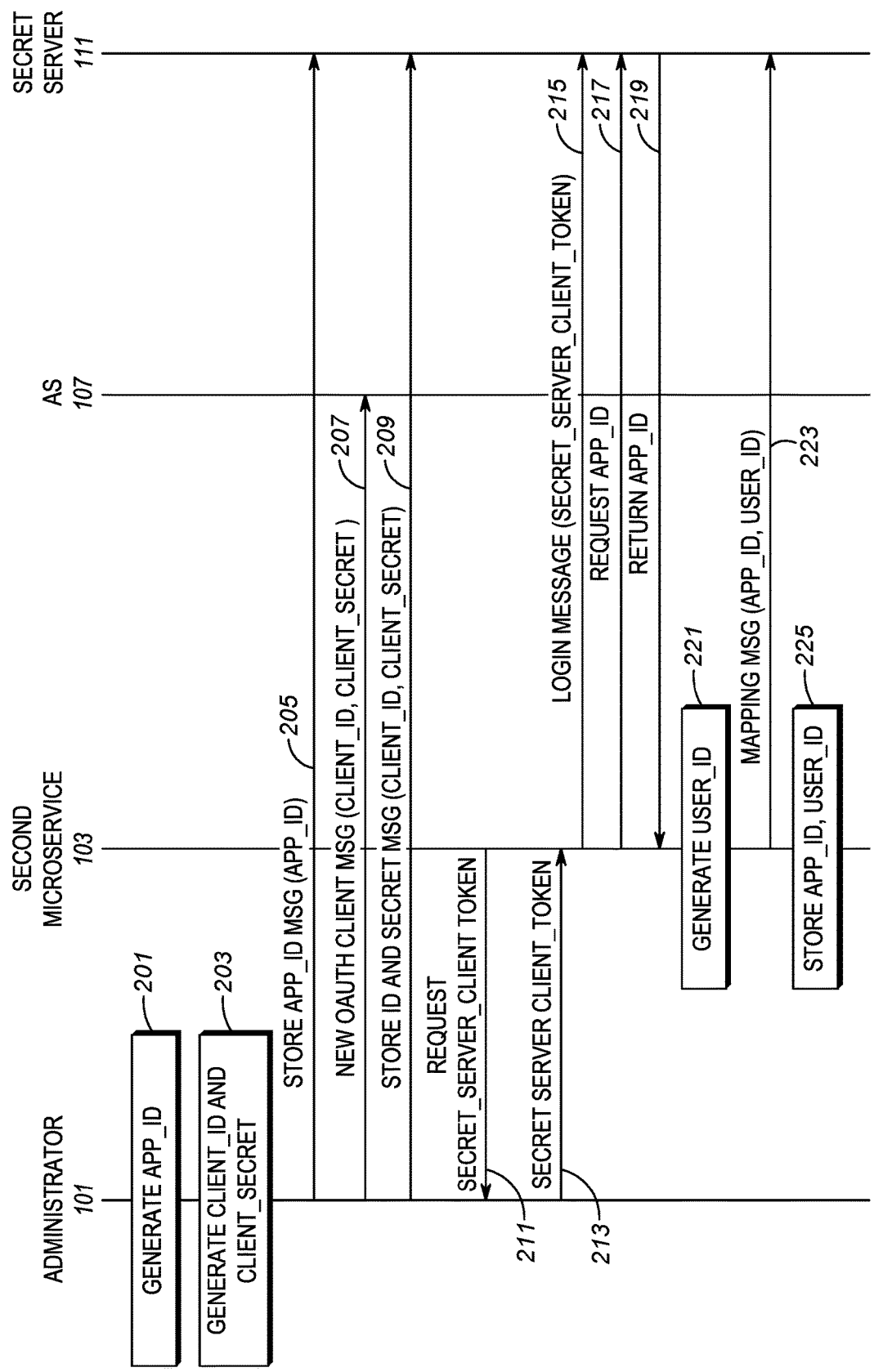
FIG. 2 illustrates a flow diagram setting forth a process for registering a microservice in an elastic cloud environment in accordance with an exemplary embodiment of the present invention.

FIG. 2 illustrates a flow diagram setting forth a process for registering a microservice in an elastic cloud environment in accordance with an exemplary embodiment of the present invention.

Administrator 101 generates 201 an application ID, APP_ID. The APP_ID represents an application, in an exemplary embodiment a microservice that lives within an elastic cloud environment.

Administrator 101 generates 203 a Client_ID and a Client_Secret. The Client_ID and Client_Secret will be used by First Microservice 105 to authenticate with Authorization Server 107 and obtain an access token.

Administrator 101 sends Store APP_ID message 205 to Secret Server 111. Store APP_ID message 205 includes the APP_ID and is sent to Secret Server 111 so that Secret Server 111 will store the APP_ID.

Administrator 101 sends New OAuth Client message 207 to Authorization Server 107. New OAuth Client message 207 includes Client_ID and Client_Secret.

Administrator 101 sends Store Client ID and client secret and Secret message 209 to Secret Server 111.

Second Microservice 103 sends Request Secret_Server_Client_Token message 211 to Administrator 101.

Administrator 101 responds to Second Microservice 103 with Secret Server Client Token message 213, which includes the Secret_Server_Client_Token.

Second Microservice 103 sends login message 215 to Secret Server 111. Login message 215 includes Secret_Server_Client_Token.

Second Microservice 103 sends Request App ID message 217 to Secret Server 111. Request App ID message 217 preferably includes Secret_Server_Client_Token.

Secret Server 111 sends Return App ID message 219 to Second Microservice 103.

Second Microservice 103 generates 221 a User_ID.

Second Microservice 103 sends Mapping Message 223 to Secret Server 111. Mapping Message 223 includes security management authentication credentials, in this exemplary embodiment the APP_ID and User_ID. Mapping Message 223 preferably includes Secret_Server_Client_Token.

Second Microservice 103 passes 225 APP_ID and USER_ID to First microservice 105.

Figure 3:
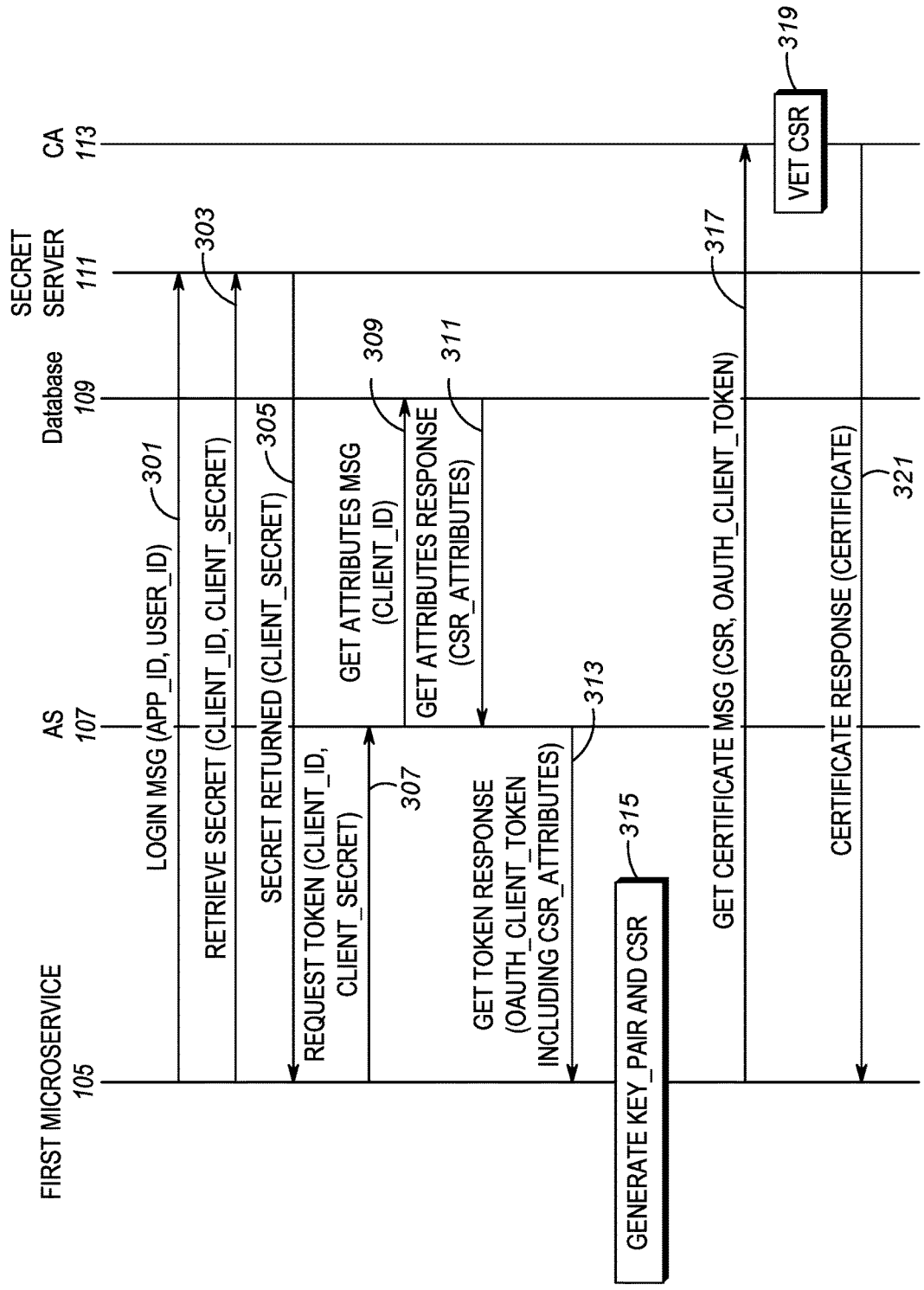
FIG. 3 illustrates a flow diagram setting forth a process for obtaining a vetted certificate by a microservice in an elastic cloud environment in accordance with an exemplary embodiment of the present invention.

FIG. 3 illustrates a flow diagram setting forth a process for obtaining a vetted certificate by a microservice in an elastic cloud environment in accordance with an exemplary embodiment of the present invention.

In one exemplary embodiment, first microservice 105 logs in to the microservice system by sending Login Message 301 to Secret Server 111. Login Message 301 includes the APP_ID and User_ID of the microservice requested.

First microservice 105 sends Retrieve Secret Message 303 to Secret Server 111. Retrieve Secret Message 303 includes the Client_ID, Client_Secret, and Secret_Server_Client_Token of the desired microservice. Utilizing messages 303 and 305, First microservice 105 utilizes the secret management authentication credentials to obtain a client secret from a secret management service.

In response to Retrieve Secret Message 303, Secret Server 111 sends Secret Returned Message 305 to First Microservice 105. Secret Returned Message 305 includes the Client_ID and Client_Secret needed to authenticate to Authorization Server 107.

First Microservice 105 sends Request Token Message 307 to Authorization Server 107. Request Token Message 307 includes the Client_ID and Client_Secret. Using messages 307, 309, 311, and 313, First Microservice 105 utilizes the client secret to obtain an access token, which will include at least one attribute that the microservice will request in its CSR, and will be used to vet the CSR request.

Authorization Server 107 sends Get Attributes Message 309 to database 109. Get Attributes Message 309 includes the Client_ID.

Database 109 sends Get Attributes Response 311 to Authorization Server 107. Get Attributes Response 311 includes CSR_Attributes.

Authorization Server 107 sends Get Token Response Message 313 to First microservice 105. Get Token Response Message 313 includes OAuth_Access_Token, which includes the CSR Attributes.

First microservice 105 generates (315) a Key_Pair and a CSR. The Key_Pair is preferably a public-private key pair.

First microservice 105 sends Get Certificate Message 317 to CA 113. Get Certificate Message 317 preferably includes the CSR and the OAuth_Client_Token).

CA 113 vets (319) the CSR, preferably by matching the attributes in the CSR to the attributes in the access token.

If CA 113 matches the attributes, CA 113 sends Certificate Response Message 321 to First microservice 105. Certificate Response Message 321 includes a Certificate including the request and the vetted attributes. In an exemplary embodiment, the Certificate is a signed X.509 certificate.

In accordance with the foregoing, an improved method and device for providing a top level orchestration function to coordinate client identities, client credentials, and client attributes across a plurality of architectural components. An improved method and device is also provided for the usage of these coordinated identities, credentials and attributes to obtain an access token used to dynamically enroll and vet a certificate signing request. The method and device enables containerized apps and microservices to obtain vetted certificates, such as X.509 certificates, in an elastic cloud environment, without exposing private keys outside of the container's RAM, so that nothing is persisted to disk making this method and device extremely secure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for obtaining a vetted certificate for a microservice in an elastic cloud environment, the method comprising:
    receiving a one-time authentication credential at the microservice;
    utilizing the one-time authentication credential to obtain a client secret;
    obtaining an access token and CSR (Certificate Signing Request) attributes at the microservice using the client secret;
    constructing a CSR at the microservice utilizing the CSR attributes;
    requesting a vetted certificate from a Certificate Authority (CA), the request including the access token and the CSR; and
    receiving a vetted certificate from the CA at the microservice.

2. The method of claim 1, wherein the one-time authentication credential comprises a type of microservice.

3. The method of claim 1, wherein the one-time authentication credential comprises a first piece of data and a second piece of data, wherein the first piece of data comprises a service type and the second piece of data comprises a service instance.

4. The method of claim 1, wherein the client secret associates a type of service with a secret management service.

5. The method of claim 1, wherein the step of receiving a vetted certificate from the CA at the microservice comprises receiving a vetted certificate from the CA at the microservice when the access token matches a stored access token at the CA.

6. The method of claim 1, wherein the step of receiving a vetted certificate from the CA at the microservice comprises receiving a vetted certificate from the CA at the microservice when the access token maps to a stored access token at the CA.

7. The method of claim 1, wherein the step of receiving a vetted certificate from the CA at the microservice comprises receiving a vetted certificate from the CA at the microservice when the access token is equivalent to a stored access token at the CA.

8. The method of claim 1, wherein the step of receiving a vetted certificate from the CA at the microservice comprises receiving a vetted certificate from the CA at the microservice when the access token is associated with a stored access token at the CA.

9. The method of claim 1, wherein the step of receiving a vetted certificate from the CA at the microservice comprises receiving a vetted certificate from the CA at the microservice when the CSR matches a stored CSR at the CA.

10. A microservice comprising:
a transceiver; and
a processor configured to:
  receive a one-time authentication credential via the transceiver;
  utilize the one-time authentication credential to obtain a client secret via the transceiver;
  obtain an access token and CSR (Certificate Signing Request) attributes using the client secret via the transceiver;
  construct a CSR utilizing the CSR attributes;
  request a vetted certificate from a Certificate Authority (CA) via the transceiver, the request including the access token and the CSR; and
  receive a vetted certificate from the CA via the transceiver if the access token and the CSR pass vetting.

11. The microservice of claim 10, wherein the onetime authentication credential comprises a type of microservice.

12. The microservice of claim 10, wherein the one-time authentication credential comprises a first piece of data and a second piece of data, wherein the first piece of data comprises a service type and the second piece of data comprises a service instance.

13. The microservice of claim 10, wherein the client secret associates a type of service with a secret management service.

14. The microservice of claim 10, wherein the processor is configured to receive a vetted certificate from the CA via the transceiver if the access token matches a stored access token at the CA.

15. The microservice of claim 10, wherein the processor is configured to receive a vetted certificate from the CA via the transceiver if the CSR matches a stored CSR at the CA.

* * * * *